United States Patent
Barbieri et al.

(10) Patent No.: US 12,478,208 B2
(45) Date of Patent: Nov. 25, 2025

(54) COOKING ADJUSTMENT SYSTEM

(71) Applicant: WHIRLPOOL CORPORATION, Benton Harbor, MI (US)

(72) Inventors: Andrea Barbieri, Milan (IT); Riccardo Loner, Busto Arsizio (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/545,100

(22) Filed: Dec. 19, 2023

(65) Prior Publication Data

US 2024/0115066 A1     Apr. 11, 2024

Related U.S. Application Data

(62) Division of application No. 17/333,547, filed on May 28, 2021, now Pat. No. 11,882,956.

(51) Int. Cl.

| A47J 27/04 | (2006.01) |
|---|---|
| A47J 36/32 | (2006.01) |
| F24C 7/08 | (2006.01) |
| H05B 6/64 | (2006.01) |
| H05B 6/68 | (2006.01) |

(52) U.S. Cl.
CPC ............ *A47J 27/04* (2013.01); *A47J 36/32* (2013.01); *F24C 7/087* (2013.01); *H05B 6/645* (2013.01); *H05B 6/647* (2013.01); *H05B 6/687* (2013.01); *A47J 2027/043* (2013.01); *A47J 2202/00* (2013.01)

(58) Field of Classification Search
CPC . F24C 7/087; F24C 7/085; A47J 36/32; A47J 2027/043; A47J 2202/00
See application file for complete search history.

(56) References Cited

U.S. PATENT DOCUMENTS

| 4,162,381 A | * | 7/1979 | Buck .................... | H05B 6/6458 426/243 |
|---|---|---|---|---|
| 4,600,596 A | * | 7/1986 | Gongwer ................. | A23L 5/13 426/523 |

(Continued)

FOREIGN PATENT DOCUMENTS

| CN | 102369961 A | 3/2012 |
|---|---|---|
| CN | 108506974 A | 9/2018 |

(Continued)

*Primary Examiner* — Thien S Tran
(74) *Attorney, Agent, or Firm* — Price Heneveld LLP

(57) ABSTRACT

A cooking adjustment system for a cooking appliance includes a body that defines a cooking cavity. A steam generator system is coupled to the body. The steam generator system is configured to inject steam into the cooking cavity. An air temperature sensor is disposed within the cooking cavity and configured to sense a dry bulb temperature. A food probe has multiple food temperature sensors. At least one of the food temperature sensors is configured to sense a surface temperature of a food item. A controller is communicatively coupled to the steam generator system, the air temperature sensor, and the food probe. The controller is configured to determine a wet bulb temperature utilizing the surface temperature of the food. The controller is configured to adjust relative humidity within the cooking cavity in response to at least one of the wet bulb temperature and the dry bulb temperature.

20 Claims, 6 Drawing Sheets

(56) References Cited

U.S. PATENT DOCUMENTS

| | | | |
|---|---|---|---|
| 4,722,268 A | 2/1988 | Rightley | |
| 4,924,072 A * | 5/1990 | Oslin | F24C 15/325 |
| | | | 219/400 |
| 5,681,496 A * | 10/1997 | Brownlow | F24C 7/087 |
| | | | 219/707 |
| 5,693,247 A | 12/1997 | Bu et al. | |
| 6,501,058 B2 | 12/2002 | Jung | |
| 6,635,854 B1 * | 10/2003 | Shelton | F24C 15/003 |
| | | | 219/486 |
| 6,753,027 B1 | 6/2004 | Greiner et al. | |
| 6,840,103 B2 | 1/2005 | Lee et al. | |
| 6,875,958 B2 | 4/2005 | Soavi et al. | |
| 7,166,824 B2 | 1/2007 | Kanzaki et al. | |
| 7,358,464 B2 | 4/2008 | Beier et al. | |
| 7,378,620 B2 | 5/2008 | Lubrina | |
| 8,556,502 B2 | 10/2013 | Austen et al. | |
| 9,060,523 B1 * | 6/2015 | Buller-Colthurst | A23L 5/13 |
| 9,474,404 B2 | 10/2016 | Jeong et al. | |
| 10,681,776 B2 | 6/2020 | Pereira et al. | |
| 10,731,869 B2 | 8/2020 | Ghiglieri et al. | |
| 2002/0173041 A1 | 11/2002 | Canas et al. | |
| 2009/0133684 A1 | 5/2009 | Embury et al. | |
| 2010/0178395 A1 | 7/2010 | Embury et al. | |
| 2015/0010679 A1 | 1/2015 | Strong et al. | |
| 2019/0313485 A1 | 10/2019 | Galindo Perez et al. | |
| 2020/0260529 A1 | 8/2020 | De Menezes Pereira et al. | |
| 2020/0278116 A1 * | 9/2020 | Kobayashi | A47J 36/32 |
| 2021/0010870 A1 * | 1/2021 | Kristensen | G01K 1/026 |
| 2021/0088388 A1 | 3/2021 | Lees et al. | |

FOREIGN PATENT DOCUMENTS

| | | | |
|---|---|---|---|
| DE | 4032949 A1 | 4/1992 | |
| DE | 19945021 C2 | 10/2003 | |
| DE | 202005017251 U1 | 3/2007 | |
| DE | 10335295 B4 | 2/2008 | |
| DE | 102009019613 A1 | 11/2010 | |
| EP | 3550213 A1 | 10/2019 | |
| EP | 3739335 A2 | 11/2020 | |
| JP | S6217535 A | 1/1987 | |
| JP | 2020139709 A | 9/2020 | |
| WO | WO-2019052613 A1 * | 3/2019 | G01K 1/024 |
| WO | 2020094573 A1 | 5/2020 | |

* cited by examiner

COOKING ADJUSTMENT SYSTEM

CROSS-REFERENCE TO RELATED APPLICATION

This application is a divisional of U.S. patent application Ser. No. 17/333,547, filed on May 28, 2021, now U.S. Pat. No. 11,882,956, entitled "COOKING ADJUSTMENT SYSTEM," the entire disclosure of which is incorporated herein in its entirety.

BACKGROUND OF THE DISCLOSURE

The present disclosure generally relates to a cooking adjustment system, and more specifically, to a cooking adjustment system for a cooking appliance.

SUMMARY OF THE DISCLOSURE

According to one aspect of the present disclosure, an automatic cooking adjustment system for an appliance includes a body that defines a cooking cavity. A steam generator system is coupled to the body. The steam generator system is configured to inject steam into the cooking cavity. An air temperature sensor is disposed within the cooking cavity. The air temperature sensor is configured to sense a dry bulb temperature within the cooking cavity. An infrared sensor is disposed within the cooking cavity. The infrared sensor is configured to sense a surface temperature of a food item disposed within the cooking cavity. A controller is communicatively coupled to the infrared sensor, the air temperature sensor, and the steam generator system. The controller is configured to determine a wet bulb temperature using the surface temperature sensed by the infrared sensor. The controller is configured to adjust relative humidity within the cooking cavity via the steam generator system in response to at least one of the wet bulb temperature and the dry bulb temperature.

According to another aspect of the present disclosure, a cooking adjustment system for a cooking appliance includes a body that defines a cooking cavity. A steam generator system is coupled to the body. The steam generator system is configured to inject steam into the cooking cavity. An air temperature sensor is disposed within the cooking cavity and configured to sense a dry bulb temperature. A food probe has multiple food temperature sensors. At least one of the food temperature sensors is configured to sense a surface temperature of a food item. A controller is communicatively coupled to the steam generator system, the air temperature sensor, and the food probe. The controller is configured to determine a wet bulb temperature utilizing the surface temperature of the food. The controller is configured to adjust relative humidity within the cooking cavity in response to at least one of the wet bulb temperature and the dry bulb temperature.

According to yet another aspect of the present disclosure, a method of adjusting a cooking operation includes measuring a dry bulb temperature within a cooking cavity and measuring a surface temperature of a food item positioned within the cooking cavity. A wet bulb temperature is determined using the surface temperature. A relative humidity within the cooking cavity is determined based on the wet bulb temperature and the dry bulb temperature. The relative humidity within the cooking cavity is adjusted in response to the wet bulb temperature.

These and other features, advantages, and objects of the present disclosure will be further understood and appreciated by those skilled in the art by reference to the following specification, claims, and appended drawings.

Figure 1:
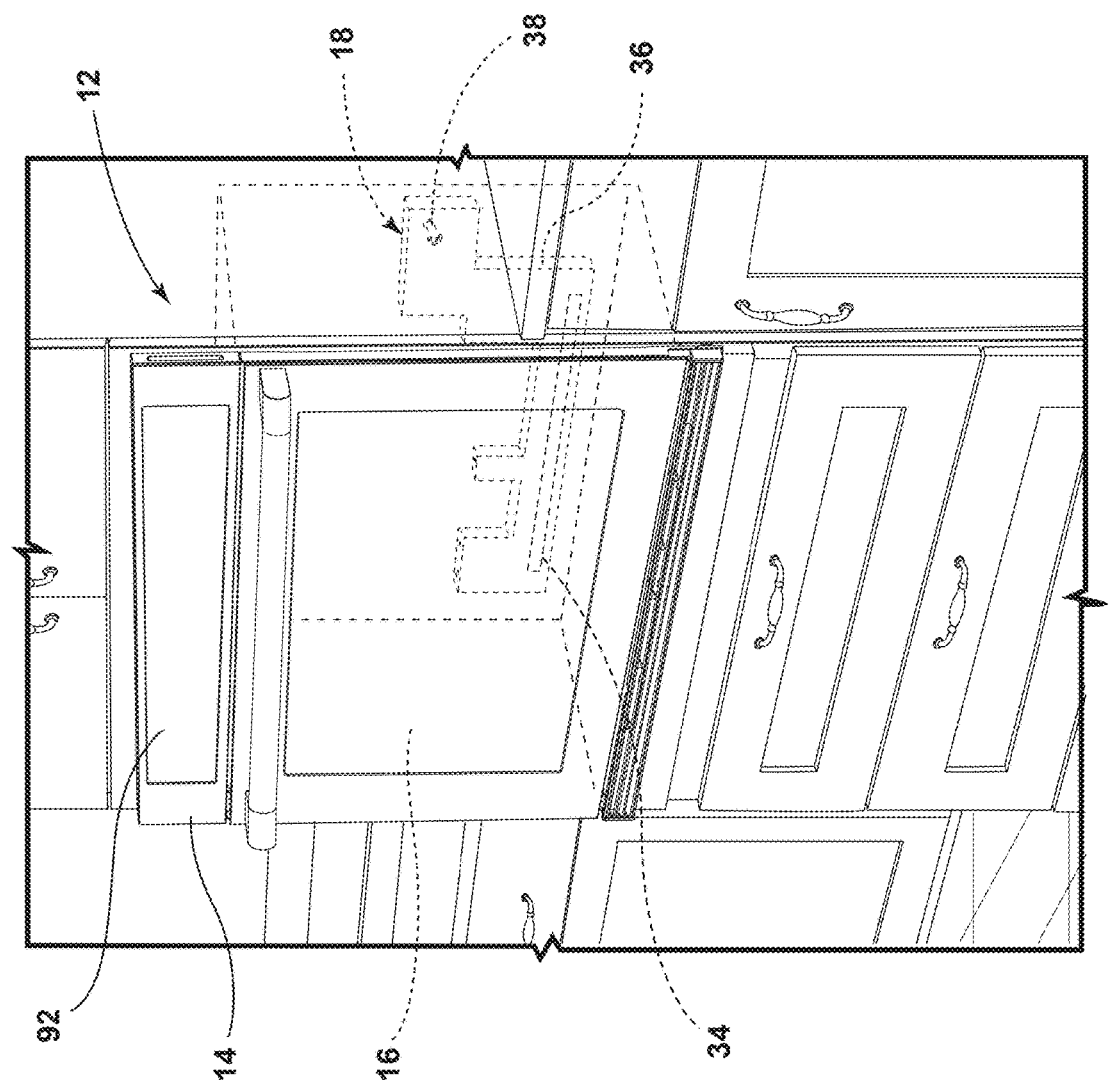
FIG. 1 is a front perspective view of a cooking appliance having a cooking adjustment system, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a cooking adjustment system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With reference to FIGS. 1-6, reference numeral 10 generally designates a cooking adjustment system for an appliance 12 that includes a body 14 defining a cooking cavity 16. A steam generator system 18 is coupled to the body 14. The steam generator system 18 is configured to inject steam into the cooking cavity 16. An air temperature sensor 20 is disposed within the cooking cavity 16. The air temperature sensor 20 is configured to sense a dry bulb temperature within the cooking cavity 16. An infrared sensor 22 is disposed within the cooking cavity 16. The infrared sensor 22 is configured to sense a surface temperature of a food item 24 disposed within the cooking cavity 16. A controller 26 is communicatively coupled to the infrared sensor 22, the air temperature sensor 20, and the steam generator system 18. The controller 26 is configured to determine a wet bulb temperature using the surface temperature sensed by the infrared sensor 22. The controller 26 is configured to adjust a relative humidity within the cooking cavity 16 via the steam generator system 18 in response to at least one of the wet bulb temperature and the dry bulb temperature.

Referring to FIG. 1, the appliance 12 is generally a cooking appliance 12, such as an oven, a microwave oven, a steam oven, a pure steam oven, a 3-in-1 oven, a combi-steam oven, a microwave-combi-steam oven, or other appliances 12 having the cooking cavity 16. Additionally or alternatively, the appliance 12 may be a slide-in appliance 12, a standalone appliance 12, a built-in appliance 12, a countertop appliance 12, etc. Generally, the appliance 12 has a steam function (e.g., the steam generator system 18) for cooking the food item 24 within the cooking cavity 16 by using steam. The steam generator system 18 includes a boiler 34 and a tank or container 36 for housing water that is used to generate the steam based on an operation of the boiler 34. The cooking adjustment system 10 may automatically activate and deactivate the steam generator system 18, as well as control a temperature of the water in the steam generator system 18.

A fluid connector 38 extends between the container 36 and the cooking cavity 16. In the illustrated example, the container 36 is disposed in a rear portion of the appliance 12 and the fluid connector 38 extends between the container 36 and the cooking cavity 16. As illustrated, the fluid connector 38 extends through a rear wall 40 that at least partially defines the cooking cavity 16 to fluidly couple the container 36 and the cooking cavity 16. Other configurations and positions of the steam generator system 18, including the boiler 34, the container 36, and the fluid connector 38, are contemplated without departing from the teachings herein.

Figure 2:
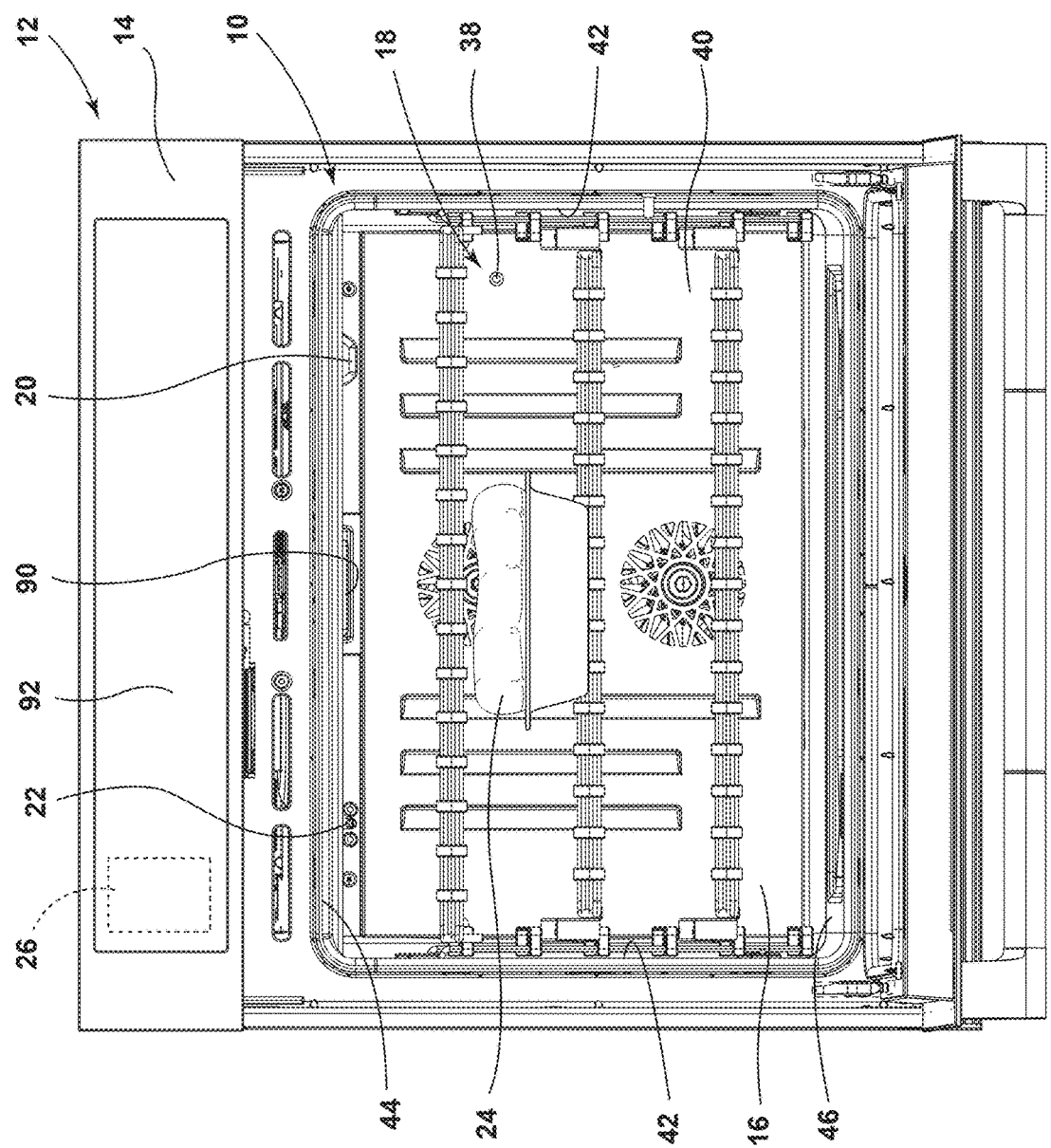
FIG. 2 is a front elevational view of a cooking cavity having an infrared sensor and an air temperature sensor for a cooking adjustment system, according to the present disclosure.

Referring still to FIG. 1, as well as FIG. 2, the cooking adjustment system 10 is configured to automatically adjust a cooking process of the food item 24 and the relative humidity within the cooking cavity 16 in response to the food item 24. The cooking process generally includes, a cooking time, a cooking temperature, a cooking operation (convection, steam, etc.), etc. In conventional ovens, relative humidity values are pre-set through boilerplate duty cycle, in an open loop control, and cannot be adjusted during the cooking process. In other applications, relative humidity values are controlled through closed loop algorithms with dedicated sensors, such as humidity sensors, oxygen sensors, etc. The cooking adjustment system 10 disclosed herein allows for dynamic and automatic adjustment and fine-tuning of the relative humidity during the cooking process in response to various conditions relating to the cooking cavity 16 and the food item 24. In this way, more precise cooking, more precise cooking time estimations, and more precise use of the steam generator system 18 may occur in the appliance 12 with the cooking adjustment system 10.

The controller 26 utilizes various sensed conditions to control and adjust the cooking process and the steam generator system 18. One of the sensed conditions utilized by the cooking adjustment system 10 is the dry bulb temperature sensed by the air temperature sensor 20. The air temperature sensor 20 is disposed within the cooking cavity 16. The air temperature sensor 20 may be coupled to the rear wall 40, sidewalls 42, a top 44, a bottom 46, or elsewhere within or proximate to the cooking cavity 16.

The air temperature sensor 20 is configured to sense an air temperature within the cooking cavity 16. The air temperature is also referred to as the dry bulb temperature. The air temperature is generally referred to as the "dry bulb" because the air temperature as sensed by the air temperature sensor 20 may not be affected by moisture within the air. The air temperature sensor 20 may be a negative temperature coefficient (NTC) thermistor, a resistance temperature detector (RTD), or other sensors configured to sense the air temperature within the cooking cavity 16.

The cooking adjustment system 10 may also include the infrared sensor 22 disposed within the cooking cavity 16. The infrared sensor 22 may be an image-based sensor, such as a camera, or other types of sensor. The infrared sensor 22 may be disposed within the cooking cavity 16, including on the rear wall 40, either of the sidewalls 42, the top 44, the bottom 46, or elsewhere within or proximate to the cooking cavity 16. The infrared sensor 22 is oriented toward the center of the cooking cavity 16 to sense data regarding the food item 24. In certain aspects, the infrared sensor 22 is configured to sense the surface temperature of the food item 24 disposed within the cooking cavity 16. The surface temperature may include the temperature at the surface and/or the temperature of an area surrounding the food item 24.

The infrared sensor 22 may be advantageous for measuring the surface temperature in a robust manner, particularly for food items 24 that may change volume during a cooking process, such as rising or shrinking. The infrared sensor 22 may be utilized for contactless monitoring of the food item 24. In this way, the infrared sensor 22 may be utilized to sense the surface temperature of the food item 24 without the use of additional devices, which may be invasive for the food item 24. The sensed surface temperature may be utilized to determine the wet bulb temperature as described further herein.

Figure 3:
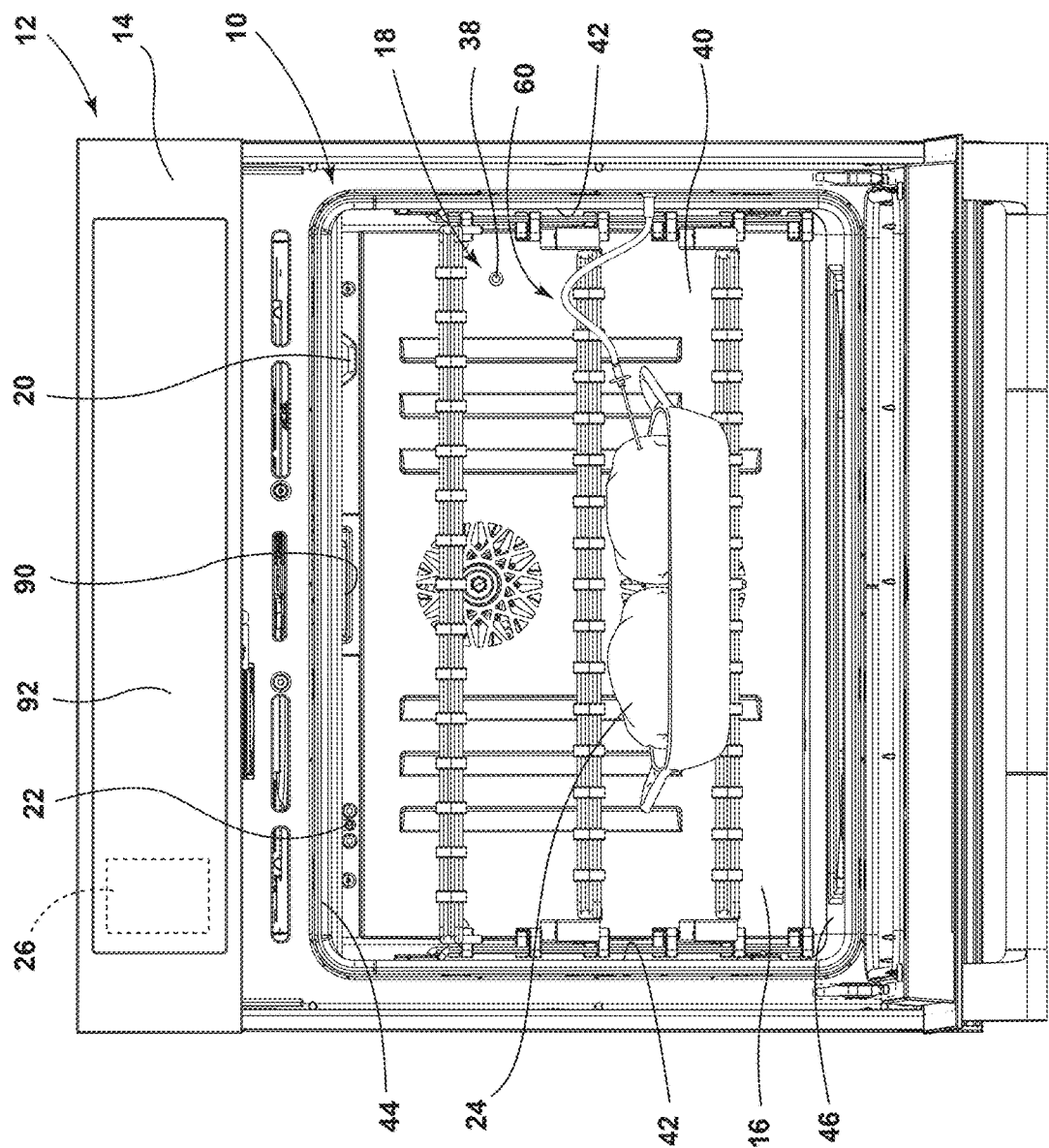
FIG. 3 is a front elevational view of a cooking cavity having an air temperature sensor and a food probe for a cooking adjustment system, according to the present disclosure.
Figure 4:
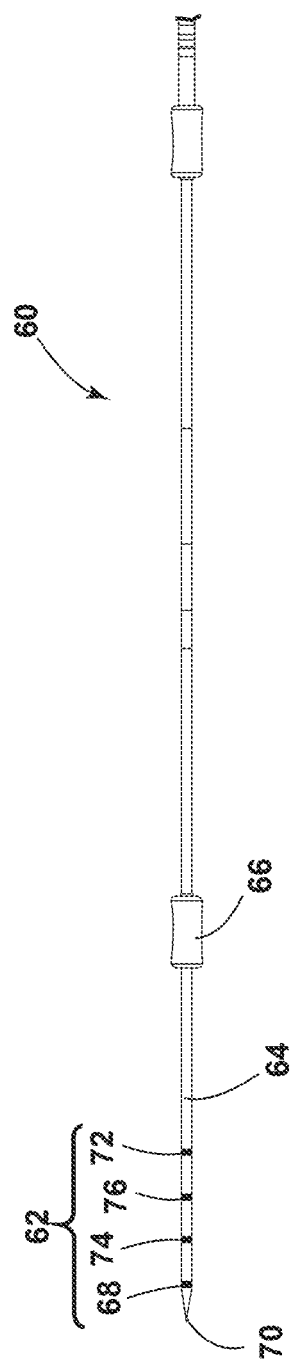
FIG. 4 is a side elevational view of a food probe having multiple food temperature sensors, according to the present disclosure.

Referring to FIGS. 3 and 4, an additional or alternative configuration of the cooking adjustment system 10 in the appliance 12 is illustrated. In addition or in lieu of the infrared sensor 22 (FIG. 2), the cooking adjustment system 10 may include a food probe 60, which may be inserted into the food item 24 by a user. The food probe 60 is generally coupled to the appliance 12, such as, for example, one of the sidewalls 42. In this way, the food probe 60 may be in communication with the controller 26. The food probe 60 may be advantageous for providing data about the food item 24 without adjusting the cooking appliance 12.

The food probe 60 generally includes multiple food temperature sensors 62 arranged along an insertion portion 64 of the food probe 60. The food temperature sensors 62 are configured to sense a food temperature at different depths within the food item 24 or proximate to the food item 24 relative to a surface of the food item 24. In the example illustrated in FIG. 4, the food probe 60 includes four food temperature sensors 62. The food probe 60 may include any practicable number of food temperature sensors 62, including more than four food temperature sensors 62. As illustrated, the food temperature sensors 62 are evenly spaced but may be spaced irregularly along the food probe 60. Additionally or alternatively, the food temperature sensors 62 may be arranged along a greater length of the food probe 60 without departing from the teachings herein.

The food probe 60 may include a stopper 66, which may minimize or prevent the food probe 60 from being inserted further into the food item 24. The stopper 66 may assist with aligning the various food temperature sensors 62 at selected depths within the food item 24. The stopper 66 may also be advantageous for providing a grasping location for the user. The food probe 60 illustrated in FIG. 4 is merely exemplary and not meant to be limiting. The food probe 60 may have a variety of configurations, such as different numbers and arrangements of food temperature sensors 62, for use with the various types of food items 24 without departing from the teachings herein. Moreover, it is contemplated that the infrared sensor 22 (FIG. 2) may be integrated into the food probe 60 without departing from the teachings herein.

At least one of the food temperature sensors 62 is a core temperature sensor 68. In the illustrated configuration, the core temperature sensor 68 is disposed proximate to a distal end 70 of the food probe 60. The core temperature sensor 68 is configured to be positioned in an inner core area of the food item 24 and is configured to sense a core temperature of the food item 24.

At least one of the food temperature sensors 62 is a surface temperature sensor 72, which may generally be disposed proximate to the stopper 66. Two additional food temperature sensors 74, 76 are illustrated between the core temperature sensor 68 and the surface temperature sensor 72. The core temperature sensor 68 may be positioned at an innermost location of the food item 24 relative to the surface of the food item 24. The surface temperature sensor 72 may be positioned outside of the food item 24 proximate to or abutting the surface of the food item 24. The additional food temperature sensors 74, 76 may be arranged at a first depth closer to the inner core region and a second depth closer to the surface, respectively.

The surface temperature sensor 72 is configured to be positioned outside of the food item 24. The surface temperature sensor 72 may utilize evaporative cooling from the food item 24 to sense the surface temperature of the food item 24. While the food item 24 is heated, fluid evaporates from the surface of the food item 24, which may be sensed by the surface temperature sensor 72. This surface temperature is communicated to the controller 26 and may be utilized to determine the wet bulb temperature as described further herein.

Figure 5:
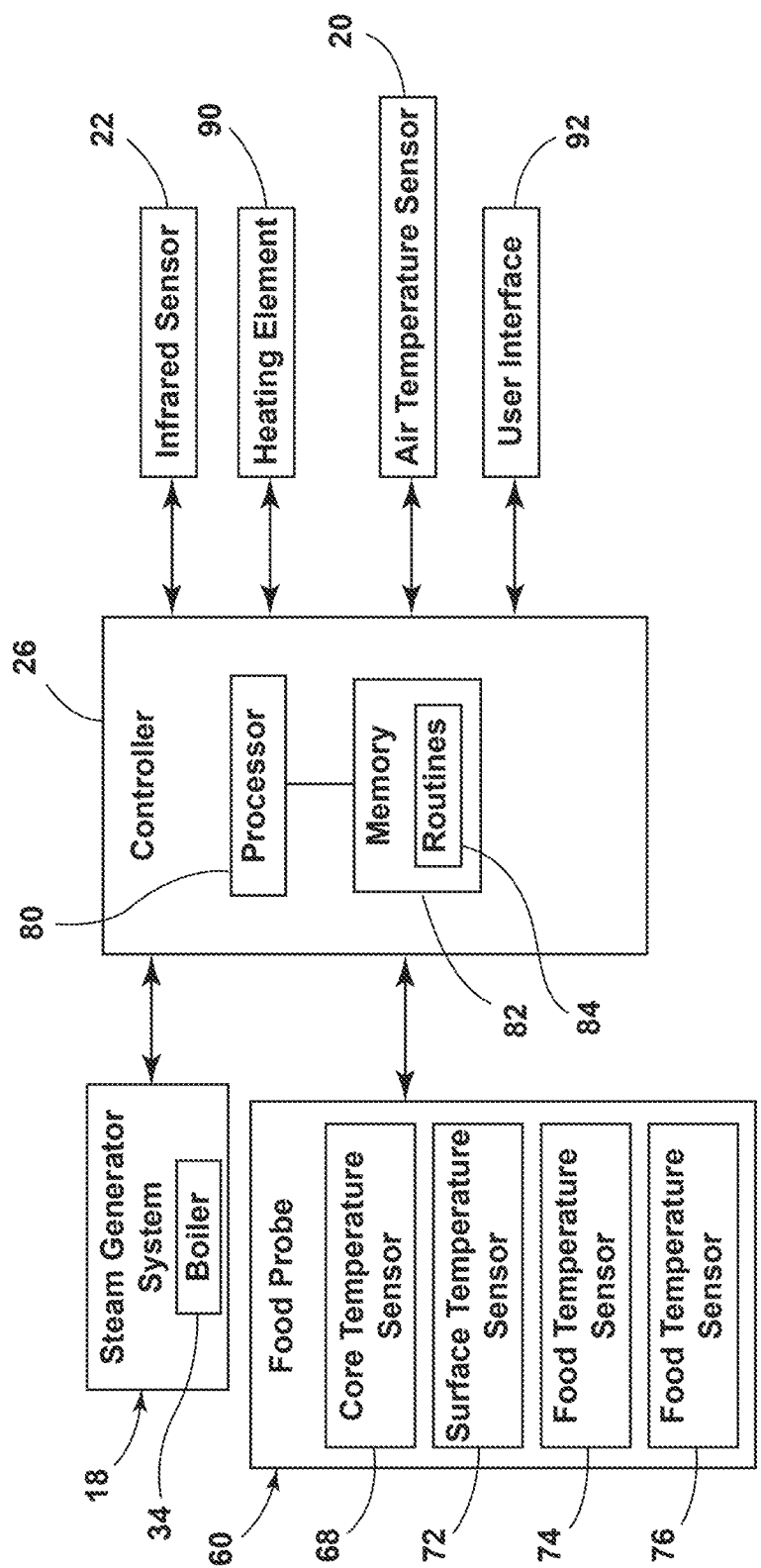
FIG. 5 is a block diagram of a cooking adjustment system, according to the present disclosure.

Referring to FIG. 5, as well FIGS. 1-4, the controller 26 includes a processor 80, a memory 82, and other control circuitry. Instructions or routines 84 are stored in the memory 82 and executable by the processor 80. The controller 26 disclosed herein may include various types of control circuitry, digital or analog, and may each include the processor 80, a microcontroller, an application specific circuit (ASIC), or other circuitry configured to perform the various input or output, control, analysis, or other functions described herein. The memory 82 described herein may be implemented in a variety of volatile and nonvolatile memory 82 formats. The routines 84 include operating instructions to enable various methods and functions described herein.

The cooking adjustment system 10 regulates temperature and relative humidity within the cooking cavity 16 based on the food item 24. The controller 26 may be in communication with the air temperature sensor 20, the infrared sensor 22, the food probe 60, and the steam generator system 18. The cooking adjustment system 10 may utilize one or both of the infrared sensor 22 and the food probe 60, which are each configured to sense the surface temperature of the food item 24. The controller 26 utilizes the surface temperature to determine the wet bulb temperature.

The wet bulb temperature is generally an adiabatic saturation temperature. The adiabatic evaporation of water or liquid from the food item 24 and the cooling effect from the evaporation is indicated by the wet bulb temperature, which is generally lower than the dry bulb temperature in the air. The rate of evaporation from the food item 24 and the temperature difference between the dry bulb temperature and the wet bulb temperature depends on the relative humidity in the air. The evaporation from the food item 24 is reduced when the air contains more water vapor.

The wet bulb temperature is between the dry bulb temperature and a dew point. For the wet bulb temperature, there is a dynamic equilibrium between heat gained because the wet bulb (e.g., the food item 24) is cooler than the surrounding air and heat lost because of evaporation. The wet bulb temperature is generally the temperature of the food item 24 that can be achieved through evaporative cooling. Generally, the wet bulb temperature is the actual temperature of the surface of the food item 24 as soon as there is evaporative cooling and the actual temperature at which the food item 24 is cooked. The wet bulb temperature may be utilized by the cooking adjustment system 10 for managing and adjusting various aspects of the cooking process, including managing the relative humidity within the cooking cavity 16.

Referring still to FIGS. 1-5, a delta or difference between the surface temperature and the core temperature may determine a heat transfer rate and, consequently, a cooking time of the food item 24. Increasing the heat transfer rate between the surface and the inner core region results in a decrease in the cooking time. The wet bulb temperature may be increased to increase the heat transfer rate and ultimately the core temperature. The increase in the wet bulb temperature then generally results in a decrease in the cooking time. The wet bulb temperature may be adjusted by adjusting the relative humidity within the cooking cavity 16.

The core temperature may be sensed by the food probe 60 and communicated to the controller 26. Additionally or alternatively, the controller 26 may estimate the core temperature. In such examples, the controller 26 may utilize the surface temperature sensed by the infrared sensor 22, relative humidity within the cooking cavity 16, the dry bulb temperature, or other conditions of the appliance 12 or food item 24 to estimate the core temperature.

A difference between the wet bulb temperature and the dry bulb temperature allows the controller 26 to determine the relative humidity within the cooking cavity 16. The relative humidity of an air-water mixture is generally a ratio between the actual mass of steam and the mass of steam that would be present at a saturation condition at the same total pressure and temperature. In a saturated environment, the relative humidity is equal to one. Generally, there is a predefined relationship between the wet bulb temperature, the dry bulb temperature, and the relative humidity. Generally, the greater the difference between the wet bulb temperature and the dry bulb temperature, the lower the relative humidity as the wet bulb is colder. As the difference increases, the relative humidity decreases. Therefore, as the wet bulb temperature increases and the dry bulb temperature is maintained, the difference decreases and the relative humidity is increased.

The dry bulb temperature sensed by the air temperature sensor 20 and the wet bulb temperature determined by using the sensed surface temperature may be utilized to calculate the relative humidity. At least one routine 84 of the controller 26 may be utilized to calculate the relative humidity from the wet bulb temperature and the dry bulb temperature. The routine 84 may utilize, for example, the Ashrae Psychometric Chart No. 1, which defines the relation between relative humidity, the wet bulb temperature, and the dry bulb temperature.

To increase the wet bulb temperature, the controller 26 may augment the relative humidity within the cooking cavity 16 by activating the steam generator system 18 to inject steam into the cooking cavity 16. As steam is utilized to cook the food item 24, by injecting steam, the cooking adjustment system 10 may dynamically adjust and control the cooking process of the food item 24 based on the sensed wet bulb temperature and the calculated relative humidity. As the sensed wet bulb temperature changes, the controller 26 may dynamically adjust the relative humidity. For example, steam may be injected into the cooking cavity 16 to increase the wet bulb temperature and, consequently, to decrease the cooking time.

In various aspects, the controller 26 may store a predefined relative humidity. The predefined relative humidity may be pre-set based on a cooking situation or operation, which may include, for example, the dry bulb temperature, a type of the food item 24, a type of cooking process, etc. The calculated relative humidity may be compared to the predefined relative humidity. The controller 26 may increase or decrease steam within the cooking cavity 16 to better align the calculated relative humidity with the predefined relative humidity. The controller 26 may activate the boiler 34 to produce the amount of steam that better aligns with the predefined relative humidity. The relative humidity may be adjusted based on the wet bulb temperature or both the wet bulb temperature and the predefined relative humidity. The cooking adjustment system 10 may dynamically change when and how much steam is injected into the cooking cavity 16.

The cooking adjustment system 10 may use various aspects of the cooking cavity 16 and the food item 24 to dynamically control and adjust the cooking process. The cooking adjustment system 10 may utilize the core temperature (e.g., a target temperature) of the food item, the air temperature or the dry bulb temperature, and the surface temperature or the wet bulb temperature. By monitoring these aspects throughout the cooking process, the cooking adjustment system 10 may provide more precise cooking time estimations and optimize control of the relative humidity within the cooking cavity 16. When using the cooking adjustment system 10, the cooking process is determined and governed by the food item 24, which provides for the wet bulb temperature that affects the relative humidity. In this way, the relative humidity may not be pre-set with the cooking adjustment system 10.

Referring still to FIGS. 1-5, the steam generator system 18 is generally used to at least partially cook the food item 24. The controller 26 may be configured to determine a stage or step of the cooking process of the food item 24 utilizing the relative humidity. The cooking adjustment system 10 may increase relative humidity by activating the steam generator system 18 to decrease cooking time and may also adjust a type of cooking by lowering the relative humidity and increasing the dry bulb temperature. The cooking adjustment system 10 may be configured to brown the food item 24.

In various aspects, the controller 26 is communicatively coupled to a heating element 90 of the cooking appliance 12. The heating element 90 may adjust a cooking temperature or the air temperature within the cooking cavity 16. In this way, the heating element 90 adjusts the dry bulb temperature within the cooking cavity 16. The cooking adjustment system 10 may also reduce the relative humidity within the cooking cavity 16 to create a drier environment or a drier food item 24, which may help with burst browning of the surface of the food item 24. In this way, browning of the food item 24 may be controlled by adjusting the relative humidity.

By dynamically adjusting the relative humidity within the cooking cavity 16, the cooking adjustment system 10 provides savings in the amount of water used. The cooking adjustment system 10 may better manage water within the cooking cavity 16 by injecting steam according to sensed parameters of the cooking cavity 16 and the food item 24. For example, smaller and more efficient containers 36 may be utilized in the cooking appliance 12 as more precise amounts or quantities of steam are injected into the cooking cavity 16. Additionally or alternatively, the steam is injected based on the cooking process to maintain an optimal cooking temperature, rather than a pre-set value. In this way, the controller 26 may determine the quantity of steam injected into the cooking cavity 16 in response to at least the wet bulb temperature.

The cooking adjustment system 10 may be activated when the infrared sensor 22 senses the food item 24, when the food probe 60 is inserted into the food item 24, or through an input in a user interface 92. The user interface 92 may be operably coupled to the body 14 of the cooking appliance 12. The user interface 92 may include touch features, knobs, buttons, switches, or other features that allow selection related to various aspects of the cooking appliance 12. Through the user interface 92, the user may input the predefined relative humidity or may input the type of food, the cooking process, etc., which the controller 26 may relate to the predefined relative humidity based on information stored in the memory 82. The user may also monitor the cooking adjustment system 10 and/or receive updates related to the cooking adjustment system 10 through the user interface 92. It is contemplated that the user interface 92 may be included in a remote user device without departing from the teachings herein.

Figure 6:
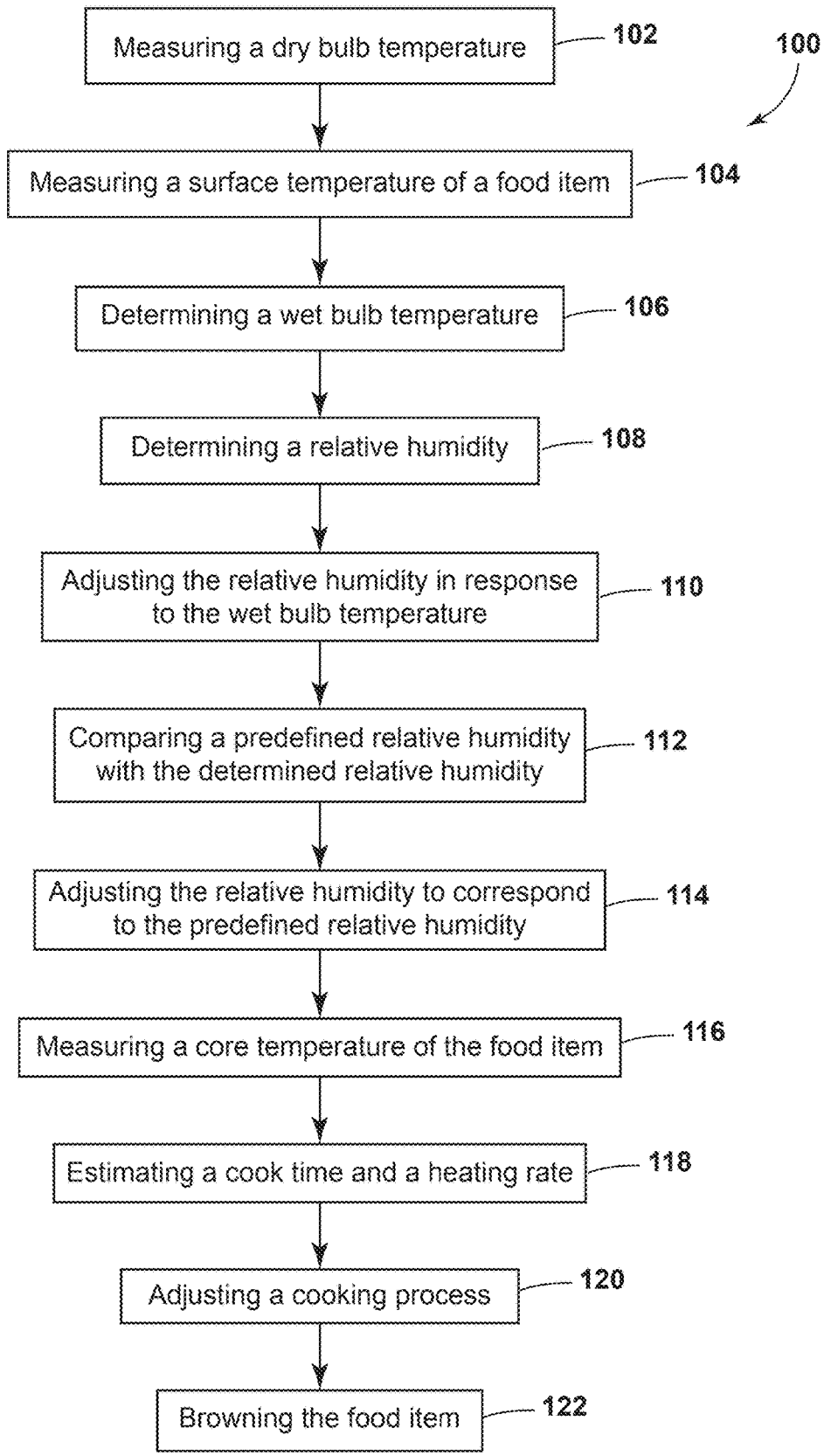
FIG. 6 is a flow diagram of a method of adjusting a cooking operation, according to the present disclosure.

Referring to FIG. 6, as well as FIGS. 1-5, a method 100 for adjusting or regulating a cooking operation includes step 102 of measuring the dry bulb temperature. Generally, the appliance 12 includes the air temperature sensor 20 configured to sense the air temperature or the dry bulb temperature within the cooking cavity 16. The dry bulb temperature is communicated to the controller 26 of the cooking adjustment system 10.

In step 104, the surface temperature of the food item 24 is measured. The surface temperature may be measured using the infrared sensor 22, the food probe 60, or a combination thereof. The infrared sensor 22 senses infrared energy emitted from the food item 24, which can be utilized to determine the surface temperature. When using the food probe 60, the surface temperature sensor 72 may measure the surface temperature using the evaporative cooling of the food item 24. Additionally or alternatively, the moisture evaporating from the food item 24 may be measured. The surface temperature, whether sensed by the infrared sensor 22, the food probe 60, or both, is communicated to the controller 26.

In step 106, the wet bulb temperature may be calculated or determined using the surface temperature sensed by one or both of the infrared sensor 22 and the food probe 60. The food item 24 and the evaporative cooling are utilized to determine the wet bulb temperature continuously throughout the cooking process. The food item 24 and the evaporation therefrom are used as the source of water or fluid for calculating wet bulb temperature.

In step 108, the controller 26 determines or calculates the relative humidity within the cooking cavity 16. The controller 26 may automatically calculate the relative humidity continuously or at intervals during the cooking process. In this way, the controller 26 may calculate the relative humidity in real-time, which may allow the cooking adjustment system 10 to dynamically adjust the cooking process. The controller 26 utilizes the sensed dry bulb temperature and the calculated wet bulb temperature to calculate the relative humidity based on the mathematical relation between the three components. The calculated relative humidity and the wet bulb temperature may be utilized to control the cooking process of the food item 24.

In step 110, the controller 26 may adjust the relative humidity within the cooking cavity 16 in response to the wet bulb temperature. The adjustment may depend on the cooking time, the current step or stage of the cooking process, or other factors. For example, a higher wet bulb temperature generally results in a higher heat transfer rate, which reduces the cooking time. The controller 26 may inject steam to increase the relative humidity or prevent steam from entering the cooking cavity 16 to lower the relative humidity to control the cooking process based on the wet bulb temperature.

In step 112, the calculated relative humidity may be compared by the predefined relative humidity stored within the controller 26. The predefined relative humidity may be selected based on, for example, the type of food item 24. In step 114, the controller 26 may adjust the relative humidity in the cooking cavity 16 to better align with the predefined relative humidity.

In step 116, the core temperature of the food item 24 may be measured or estimated. In certain aspects, the food probe 60 may be used with the core temperature sensor 68 communicating the sensed core temperature of the food item 24 to the controller 26. In examples utilizing the infrared sensor 22 without the food probe 60, the core temperature may be estimated by the controller 26 using the surface temperature, the dry bulb temperature, and/or the relative humidity.

In step 118, the controller 26 may estimate the cooking time and the heating rate based on the relative humidity. The controller 26 may determine the heating rate of the food item 24 by using the delta between the surface temperature and the core temperature. Additionally or alternatively, an estimated cooking time of the food item 24 may also be determined using the relative humidity. The relative humidity within the cooking cavity 16 affects how the food item 24 is cooked (e.g., steamed) and therefore the relative humidity and an elapsed cooking time may be utilized to estimate the remaining cooking time for the food item 24.

In step 120, the controller 26 may dynamically adjust the cooking process while the food item 24 is cooking. In this way, the cooking time, a cooking temperature (e.g., the dry bulb temperature, steam temperature, etc.), a doneness of the food item 24, and the relative humidity within the cooking cavity 16 may be dynamically adjusted as the food item 24 is cooking. In step 122, the controller 26 may utilize the relative humidity to determine the current step of the cooking process. The controller 26 may utilize the elapsed cooking time, the estimated remaining cooking time, and/or the relative humidity to determine the step or stage of the food item 24 in the cooking process.

Based on the current step of the food item 24, in step 122, the cooking adjustment system 10 may adjust the appliance 12 to brown the food item 24. Cooking the food item 24 with steam generally provides for the food item 24 to be cooked properly according to the cooking process, but the coloring of the food item 24 may be slightly pale. Therefore, cooking adjustment system 10 may utilize the steam generator system 18 to at least partially cook the food item 24 and may also operate to brown the food item 24. To brown the food item 24, the cooking adjustment system 10 may provide for a drier environment or a drier food item 24 (e.g., less free water in the food item 24). The food item 24 may become drier throughout the cooking process, by utilizing less steam in the cooking cavity 16, by increasing the dry bulb temperature, etc.

In certain aspects, the cooking adjustment system 10 may increase the dry bulb temperature and may also reduce or limit the steam injected into the cooking cavity 16 to provide a drier environment, which may assist the browning process including non-enzymatic browning. The cooking process may end with the browning of the food item 24 or may return to cooking the food item 24 with steam. The cooking adjustment system 10 may automatically regulate the relative humidity and the heating elements 90 to reach the desired doneness and browning of the food item 24 during the cooking process. The cooking process is adjusted and determined based on the food item 24, rather than pre-set values. It will be understood that the steps of the method 100 may be performed in any order, simultaneously, and/or omitted without departing from the teachings provided herein.

Use of the present device may provide for a variety of advantages. For example, the surface temperature of the food item 24 may be utilized to determine the wet bulb temperature. Additionally, the surface temperature may be sensed via the infrared sensor 22 and/or of food probe 60. Also, the wet bulb temperature may be determined based on the sensed surface temperature of the food item 24. In this way, the evaporation from the food item 24 is utilized to determine the wet bulb temperature. Further, the wet bulb temperature and the dry bulb temperature may be utilized to determine the relative humidity within the cooking cavity 16.

Also, the cooking adjustment system 10 may dynamically adjust the relative humidity within the cooking cavity 16 in response to at least one of the wet bulb temperature and the dry bulb temperature. Further, the cooking adjustment system 10, may utilize the relative humidity to adjust the cooking process of the food item 24 within the appliance 12. Additionally, the cooking adjustment system 10 may inject steam into the cooking cavity 16 to increase the wet bulb temperature, which decreases the cooking time. Also, the cooking adjustment system 10 may utilize at least one of the relative humidity and the wet bulb temperature to determine the step or stage of the cooking process in which the food item 24 is currently. Further, the cooking adjustment system 10 may utilize the relative humidity and may adjust the relative humidity to brown the food item 24 in the appliance 12. Additionally, the cooking adjustment system 10 may control the doneness and browning of the food item 24. Additional benefits or advantages may be realized and/or achieved.

The device disclosed herein is further summarized in the following paragraphs and is further characterized by combinations of any and all of the various aspects described therein.

According to another aspect of the present disclosure, an automatic cooking adjustment system for an appliance includes a body that defines a cooking cavity. A steam generator system is coupled to the body. The steam generator system is configured to inject steam into the cooking cavity. An air temperature sensor is disposed within the cooking cavity. The air temperature sensor is configured to sense a dry bulb temperature within the cooking cavity. An infrared sensor is disposed within the cooking cavity. The infrared sensor is configured to sense a surface temperature of a food item disposed within the cooking cavity. A controller is communicatively coupled to the infrared sensor, the air temperature sensor, and the steam generator system. The controller is configured to determine a wet bulb temperature using the surface temperature sensed by the infrared sensor. The controller is configured to adjust relative humidity within the cooking cavity via the steam generator system in response to at least one of the wet bulb temperature and the dry bulb temperature.

According to another aspect, a controller is configured to determine a quantity of steam to inject into a cooking cavity in response to a wet bulb temperature.

According to another aspect, a controller is configured to determine at least one of a step in a cooking process and a remaining cooking time utilizing at least one of a wet bulb temperature and a dry bulb temperature.

According to another aspect, an infrared sensor is coupled to a surface that at least partially defines the cooking cavity to provide contactless monitoring of a food item.

According to another aspect, a controller is configured to increase a wet bulb temperature by increasing a relative humidity of a cooking cavity and consequently decreases a cooking time of a food item.

According to another aspect, a food probe is in communication with a controller. The food probe is configured to sense at least one of a core temperature of a food item and a surface temperature of the food item.

According to another aspect, a cooking adjustment system for a cooking appliance includes a body that defines a cooking cavity. A steam generator system is coupled to the body. The steam generator system is configured to inject steam into the cooking cavity. An air temperature sensor is disposed within the cooking cavity and configured to sense a dry bulb temperature. A food probe has multiple food temperature sensors. At least one of the food temperature sensors is configured to sense a surface temperature of a food item. A controller is communicatively coupled to the steam generator system, the air temperature sensor, and the food probe. The controller is configured to determine a wet bulb temperature utilizing the surface temperature of the food. The controller is configured to adjust relative humidity within the cooking cavity in response to at least one of the wet bulb temperature and the dry bulb temperature.

According to another aspect, at least one multiple food temperature sensor is configured to sense a core temperature of a food item.

According to another aspect, a controller is configured to determine at least one of a heating rate and a cooking time based on a difference between a surface temperature of a food item and a core temperature of the food item.

According to another aspect, a controller is configured to activate a steam generator system to inject steam into a cooking cavity to increase a wet bulb temperature and consequently reduce a cooking time of a food item.

According to another aspect, a heating element is coupled to a body. A controller is configured to adjust at least one of a dry bulb temperature via the heating element and a relative humidity via a steam generator system to brown a food item.

According to another aspect, a controller is configured to determine a relative humidity using a wet bulb temperature and a dry bulb temperature.

According to yet another aspect, a method of adjusting a cooking operation includes measuring a dry bulb temperature within a cooking cavity and measuring a surface temperature of a food item positioned within the cooking cavity. A wet bulb temperature is determined using the surface temperature. A relative humidity within the cooking cavity is determined based on the wet bulb temperature and the dry bulb temperature. The relative humidity within the cooking cavity is adjusted in response to the wet bulb temperature.

According to another aspect, a cooking process is adjusted by injecting steam into a cooking cavity in response to a wet bulb temperature.

According to another aspect, a predefined relative humidity is compared with a relative humidity determined to be within a cooking cavity. The relative humidity to align the relative humidity in the cooking cavity with the predefined relative humidity.

According to another aspect, a food item is browned by adjusting at least one of a cooking temperature and a relative humidity within a cooking cavity.

According to another aspect, a wet bulb temperature is increased by injecting steam into a cooking cavity to reduce a cooking time.

According to another aspect, a remaining cooking time is estimated using at least one of a dry bulb temperature, a wet bulb temperature, and a relative humidity.

According to another aspect, a core temperature of a food item is measured. A heat transfer rate for the food item is determined based on a difference between the core temperature and a surface temperature.

According to another aspect, a surface temperature is sensed via at least one of a food probe and an infrared sensor.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method of adjusting a cooking operation, comprising:
measuring a dry bulb temperature within a cooking cavity;
measuring a surface temperature of a food item positioned within the cooking cavity;
determining a wet bulb temperature using the surface temperature;
determining a relative humidity within the cooking cavity based on the wet bulb temperature and the dry bulb temperature;
determining a heat transfer rate between a core temperature of the food item and the surface temperature;
adjusting the relative humidity within the cooking cavity in response to at least one of the wet bulb temperature, the dry bulb temperature, the relative humidity, and the heat transfer rate to actively adjust a cooking process in response to the food item during the cooking process; and
calculating a cooking time based on the relative humidity.

2. The method of claim 1, further comprising:
adjusting the cooking process by injecting steam into the cooking cavity in response to the wet bulb temperature.

3. The method of claim 1, further comprising:
comparing a predefined relative humidity with the relative humidity determined to be within the cooking cavity; and
adjusting the relative humidity to align the relative humidity in the cooking cavity with the predefined relative humidity.

4. The method of claim 1, further comprising:
browning the food item by adjusting at least one of the dry bulb temperature and the relative humidity within the cooking cavity.

5. The method of claim 1, further comprising:
increasing the wet bulb temperature by injecting steam into the cooking cavity to reduce the cooking time.

6. The method of claim 1, further comprising:
estimating the cooking time remaining for the cooking process using at least one of the dry bulb temperature, the wet bulb temperature, and the relative humidity.

7. The method of claim 1, further comprising:
measuring the core temperature of the food item.

8. The method of claim 1, wherein the surface temperature is sensed via at least one of a food probe and an infrared sensor.

9. A method of regulating a cooking operation, comprising:
measuring a dry bulb temperature in a cooking cavity via an air temperature sensor;
measuring a surface temperature of a food item positioned within the cooking cavity via a first temperature sensor of a food probe;
determining a wet bulb temperature using the surface temperature;
measuring a core temperature of the food item via a second temperature sensor of the food probe;
determining a relative humidity within the cooking cavity based on the wet bulb temperature and the dry bulb temperature;
adjusting the relative humidity dynamically within the cooking cavity via a steam generator system in response to at least one of the wet bulb temperature, the dry bulb temperature, and a determined relative humidity;
estimating a heat transfer rate of the food item based on a difference between the core temperature and the surface temperature; and
adjusting the wet bulb temperature to adjust the heat transfer rate to, consequently, adjust a cooking process, the cooking process being governed by the food item and dynamic adjustment of the relative humidity during the cooking process.

10. The method of claim 9, further comprising:
determining a remaining cooking time based on the heat transfer rate and an elapsed cooking time.

11. The method of claim 10, further comprising:
increasing the wet bulb temperature by injecting steam into the cooking cavity via the steam generator system to increase the heat transfer rate and, consequently, reduce the remaining cooking time.

12. The method of claim 9, further comprising:
adjusting at least one of the dry bulb temperature via a heating element and the relative humidity via the steam generator system to brown the food item.

13. The method of claim 9, further comprising:
determining a quantity of steam to inject into the cooking cavity in response to the wet bulb temperature; and
injecting the quantity of steam into the cooking cavity to adjust a cooking process based on the food item.

14. The method of claim 9, wherein the step of measuring the surface temperature of the food item includes:
utilizing evaporative cooling from the food item to sense the surface temperature with the first temperature sensor positioned outside of the food item.

15. A method of regulating a cooking operation, comprising:
measuring a dry bulb temperature in a cooking cavity via an air temperature sensor;
measuring a surface temperature of a food item positioned within the cooking cavity via an infrared sensor spaced from the food item to measure the surface temperature of the food item as the food item actively changes volume;

determining a wet bulb temperature using the surface temperature;

determining a relative humidity within the cooking cavity based on the wet bulb temperature and the dry bulb temperature;

estimating a core temperature of the food item using at least one of the wet bulb temperature, the dry bulb temperature, and a determined relative humidity;

estimating a heat transfer rate between the core temperature of the food item and the surface temperature of the food item; and actively adjusting the relative humidity within the cooking cavity during said cooking operation via a steam generator system in response to at least one of the wet bulb temperature, the dry bulb temperature, the determined relative humidity, and the heat transfer rate to, consequently, actively adjust a cooking process during the cooking process.

16. The method of claim 15, further comprising:
estimating a remaining cooking time based on at least one of the surface temperature and the core temperature.

17. The method of claim 16, further comprising:
increasing the wet bulb temperature by injecting steam into the cooking cavity via the steam generator system to reduce the remaining cooking time.

18. The method of claim 15, further comprising:
browning the food item by at least one of increasing the dry bulb temperature via a heating element and decreasing the relative humidity via the steam generator system.

19. The method of claim 15, further comprising:
estimating a remaining cooking time based on an elapsed cooking time and the determined relative humidity.

20. The method of claim 15, further comprising:
determining a remaining cooking time based on the heat transfer rate and an elapsed cooking time.

* * * * *